United States Patent [19]

Hunt

[11] Patent Number: 5,429,325
[45] Date of Patent: Jul. 4, 1995

[54] LIGHTWEIGHT NOSE CONE ASSEMBLY

[75] Inventor: John D. Hunt, Columbia, Md.

[73] Assignee: TCOM, L. P., Columbia, Md.

[21] Appl. No.: 127,600

[22] Filed: Sep. 28, 1993

[51] Int. Cl.⁶ .............................................. B64B 1/66
[52] U.S. Cl. ................................................... 244/115
[58] Field of Search ................. 244/30, 115, 116, 125, 244/127

[56] References Cited

U.S. PATENT DOCUMENTS

| | | | |
|---|---|---|---|
| 1,309,533 | 7/1919 | McKechnie et al. | 244/115 |
| 1,544,190 | 6/1925 | Smith | 244/127 |
| 1,824,453 | 9/1931 | Warth | 244/30 |
| 2,681,774 | 6/1954 | Winzen et al. | 244/31 |
| 2,707,603 | 5/1955 | Moore, Jr. | 244/31 |
| 4,762,295 | 8/1988 | Yon, Jr. | 244/115 |

FOREIGN PATENT DOCUMENTS 15389 of 1915 United Kingdom.

Primary Examiner—Galen L. Barefoot

[57] ABSTRACT

A lightweight hard nose assembly for mooring a lighter than air vehicle to a mooring mast wherein the hard nose assembly includes a cone assembly which further includes a base ring attached to the lighter than air vehicle, a top plate, including a docking probe, and a plurality of struts connecting the base ring to the cone assembly. The hard nose assembly further include a plurality of guy lines, originating from the top plate and attached to the lighter than air vehicle at a plurality of patches. This lightweight nose cone assembly for lighter than air vehicles results in substantial savings in weight and cost and is more efficient than existing hard nose structures with battens.

19 Claims, 5 Drawing Sheets

LIGHTWEIGHT NOSE CONE ASSEMBLY

The present invention relates to an improved light weight nose cone assembly for lighter than air vehicles, and more specifically, for airships and aerostats.

BACKGROUND OF THE INVENTION

A large percentage of conventional operational losses and severe damage incidents have occurred in lighter than air vehicles as a result of high winds, turbulence, and heavy precipitation, while the lighter than air vehicle was moored on a fixed or mobile mooring mast. The nose cone structure on a lighter than air vehicle serves two purposes: 1) it is used to fasten the lighter than air vehicle to the mooring mast and 2) it serves as a nose stiffening device to prevent the nose from dimpling inward due to the dynamic pressure (Q force) of the wind at high air speed.

The development of tethered aerostats, which are made of strong, lightweight fabrics, which can withstand significantly greater internal pressure than conventional lighter than air vehicles, have brought a new dimension to lighter-than-air operation. Since the internal pressure of the tethered aerostat may be increased as the wind forces increase, the need for nose stiffening to prevent cave-in of the aerostat no longer exists. Tethered aerostats also must be moored in such a way to react to the large excess lift with which aerostats operate compared to other lighter than air vehicles. Still further, aerostats are inherently designed to be operated and maintained totally outdoors in all weather, without access to hangars, contrary to other lighter than air vehicles. As a result, the nose structures on aerostats have been designed to be more robust so that aerostats can survive a much more hostile weather environment.

When lighter than air vehicles are moored, it is necessary to transfer the mooring loads from the hull fabric to the mooring tower. These loads are caused primarily by variations in wind direction and velocity. Lighter than air vehicle nose structures are designed to withstand steady state winds of at least 90 knots at ground level and enable the aerostat to survive in severe thunderstorms and frontal weather passages, while the aerostat is moored.

Previous lighter than air vehicle nose structure designs have used two basis approaches:

1. A large cone shaped truss structure with long curved battens have traditionally been used for over 20 years on large lighter than air vehicles, as illustrated in FIG. 1. These cone-shaped truss structures are very heavy and expensive to manufacture; and 2. A soft nose system which includes cable guy lines and a nose mooring probe on the vehicle which mates with the large cone structure on the mooring tower, as illustrated in FIG. 2. This requires a very large and expensive cone shaped structure on the mooring system. Further, this design is not as efficient as the FIG. 1 system in reacting mooring forces. However, it is extremely successful on lighter than air vehicles which operate in benign weather environments.

The present invention is directed to an improved lightweight nose cone assembly for lighter than air vehicles, and specifically for airships and aerostats, with equal or better strength performance than the cone and batten design illustrated in FIG. 1, but of a construction weight approaching that of the system illustrated in FIG. 2. The improved lightweight nose cone assembly for lighter than air vehicles of the present application comprises a welded metal truss and guy lines for attaching the lighter than air vehicle to its mooring tower or mast. The use of this new assembly results in substantial savings in weight and cost and is more efficient than the existing hard nose structures with battens. Further, the improved lightweight nose cone assembly for lighter than air vehicles of the present application greatly simplifies vehicle installation and inflation.

SUMMARY OF THE INVENTION

One object of the present invention is to provide an improved lightweight nose cone assembly for lighter than air vehicles which comprises a welded metal truss and guy lines for attaching an aerostat or airship to its mooring tower or mast. The improved lightweight nose cone assembly can be used with all types of aerostats and airship systems during operation or survival environmental conditions.

A further object of the present invention is to create and improved lightweight nose cone assembly which is substantially less in weight and cost than conventional nose cone assemblies.

A still further object of the present invention is to provide an improved lightweight nose cone assembly which greatly simplifies installation and inflation of the lighter than air vehicle.

A still further object of the present application is to provide an improved lightweight nose cone assembly for airships and aerostats.

These objects of the present invention are fulfilled by providing an improved lightweight nose cone assembly for lighter than air vehicles, comprising:
 a cone assembly, including
  a base ring, attached to said lighter than air vehicle,
  a top plate, including a docking probe,
  a plurality of struts connecting said base ring to said top plate; and
 a plurality of guy lines, originating from said cone assembly and attached to said lighter than air vehicle at a plurality of patches.

These objects of the present invention are also fulfilled by providing an improved lightweight hard nose assembly for mooring a lighter than air vehicle, comprising:
 nose means for attaching said lighter than air vehicle to a mooring tower and for reacting pushing forces and transverse loading from said lighter than air vehicle; and
 cable means for attaching said nose means to said lighter than air vehicle and for reacting pulling axial forces and said transverse loading from said lighter than air vehicle.

These and other objects of the present invention will become more readily apparent from the detailed description given hereinafter. However, it should be understood that a detailed description and specific examples, while indicating preferred embodiments of the invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are hoe limitive of the present invention and wherein.

It should be noted that throughout the drawing figures like numerals represent like elements.

DETAILED DESCRIPTION OF THE PREFERRED EMBODIMENTS

Figure 1:
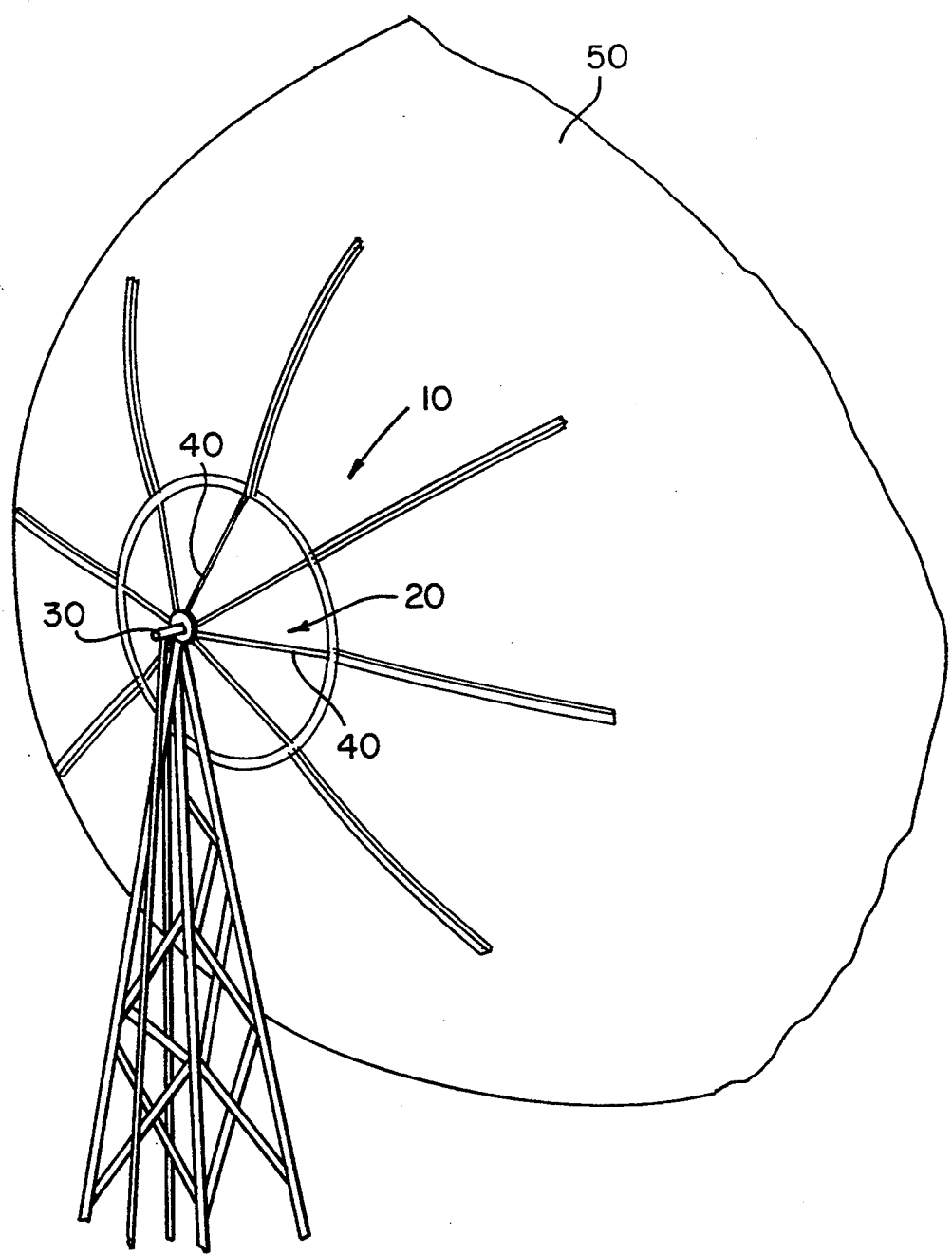
FIG. 1 illustrates a conventional cone-shaped structure with battens.
Figure 2:
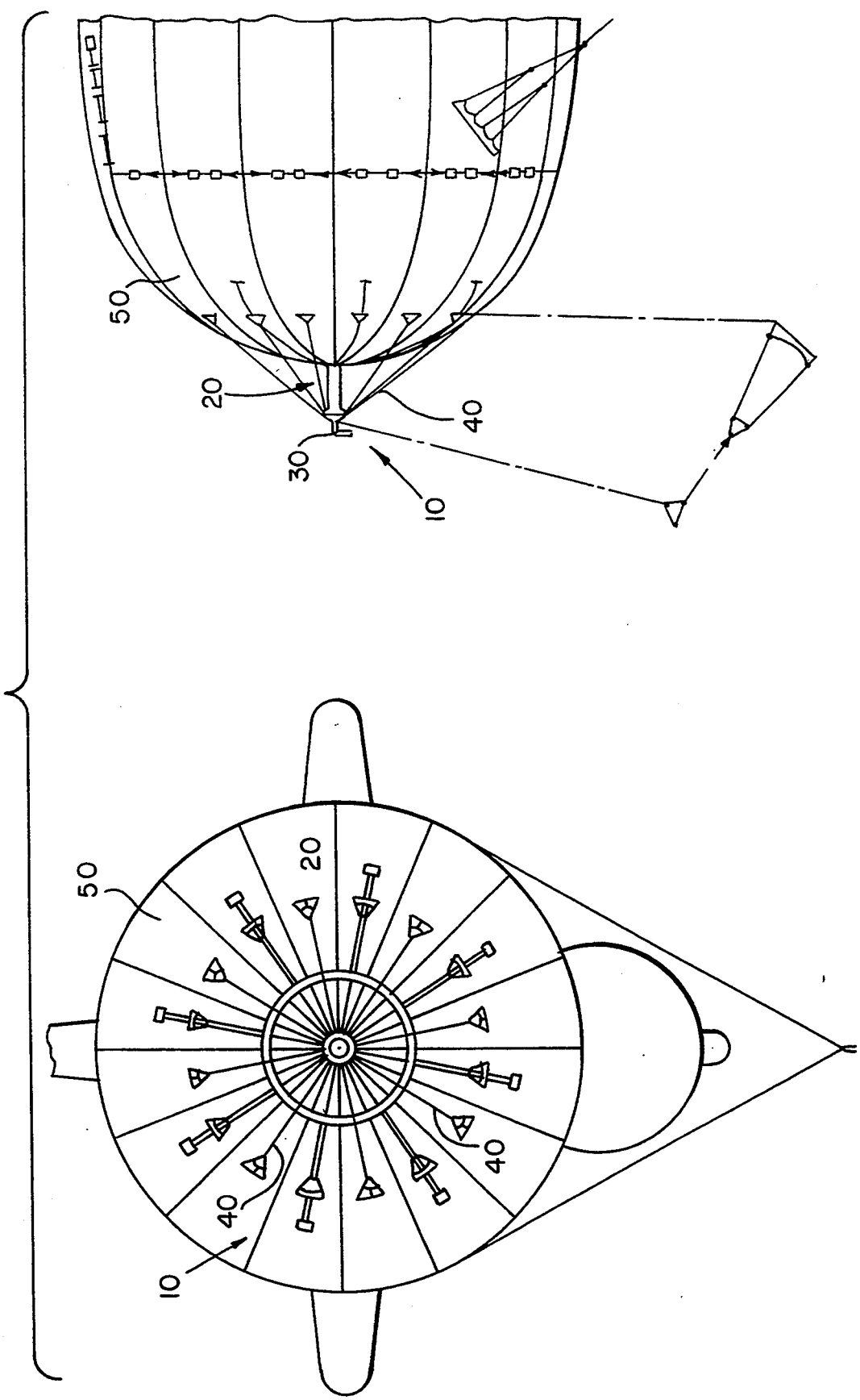
FIG. 2 illustrates a conventional soft nose system.
Figure 3:
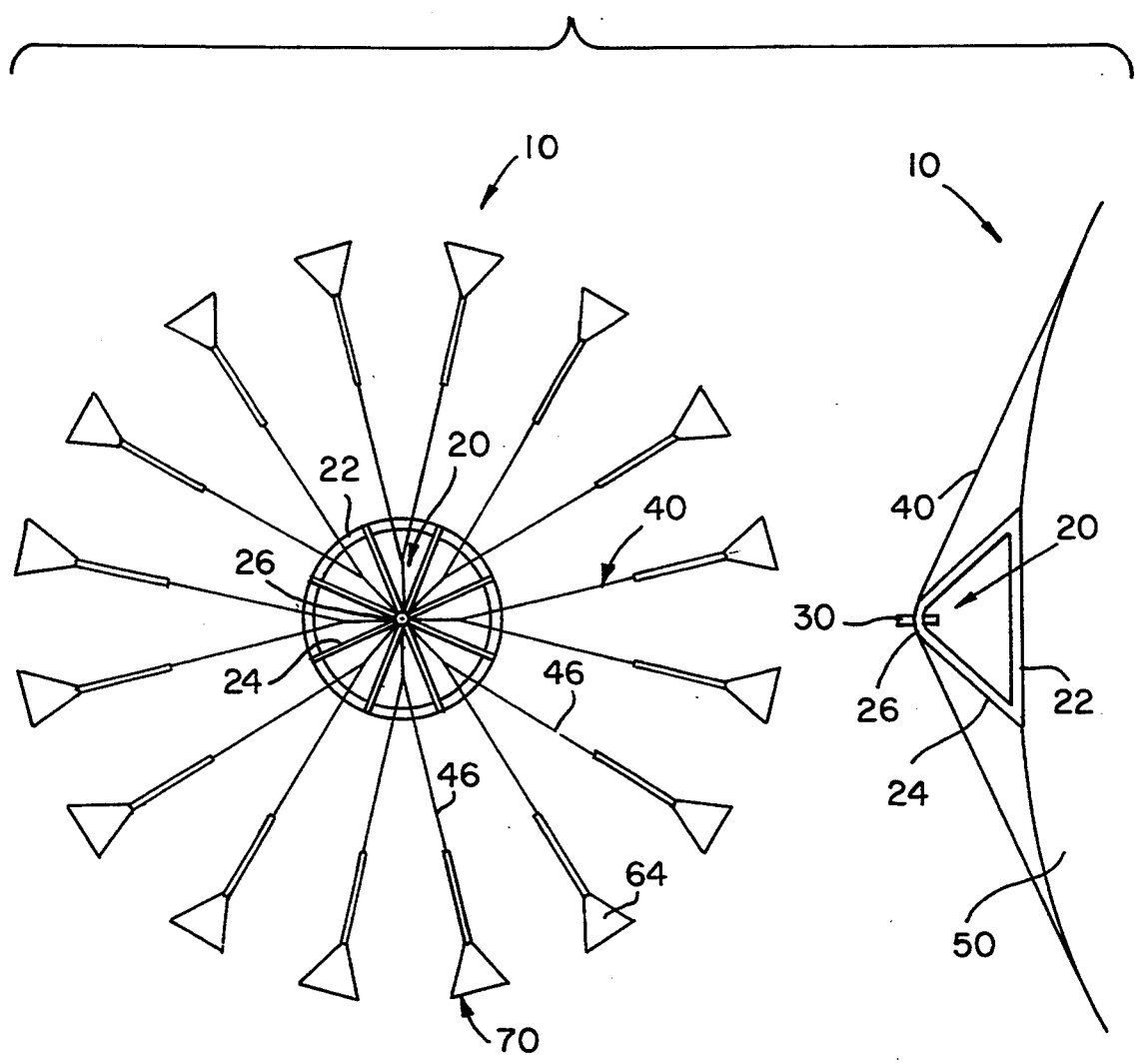
FIG. 3 illustrates the improved lightweight nose cone assembly in one embodiment of the present invention.

The improved lightweight nose cone assembly 10, as illustrated in FIG. 3, comprises a truncated cone-shaped truss assembly 20, a docking probe 30, and guy cables 40. The cone assembly 20 is a welded aluminum structure having a base ring 22, eight struts 24, and a top plate 26. The base ring 22 of the cone assembly 20 is tightly laced to the aerostat hull 50. The steel docking probe 30 is bolted to the top plate 26 and is compatible with a latch at the top of a mooring system (not shown). The guy lines 40 extend from the apex of the cone to points tangential to the aerostat hull 50.

The basic operating concept of the improved lightweight nose cone assembly 10 for lighter than air vehicles of the present application is that pulling axial forces are reacted primarily by the guy cables 40, pushing forces are supported by the nose cone and reacted by the aerostat hull 50 pressure forces, and transverse loading is reacted by guy cable tensions and shear forces in the nose cone base ring 22.

Figure 4:
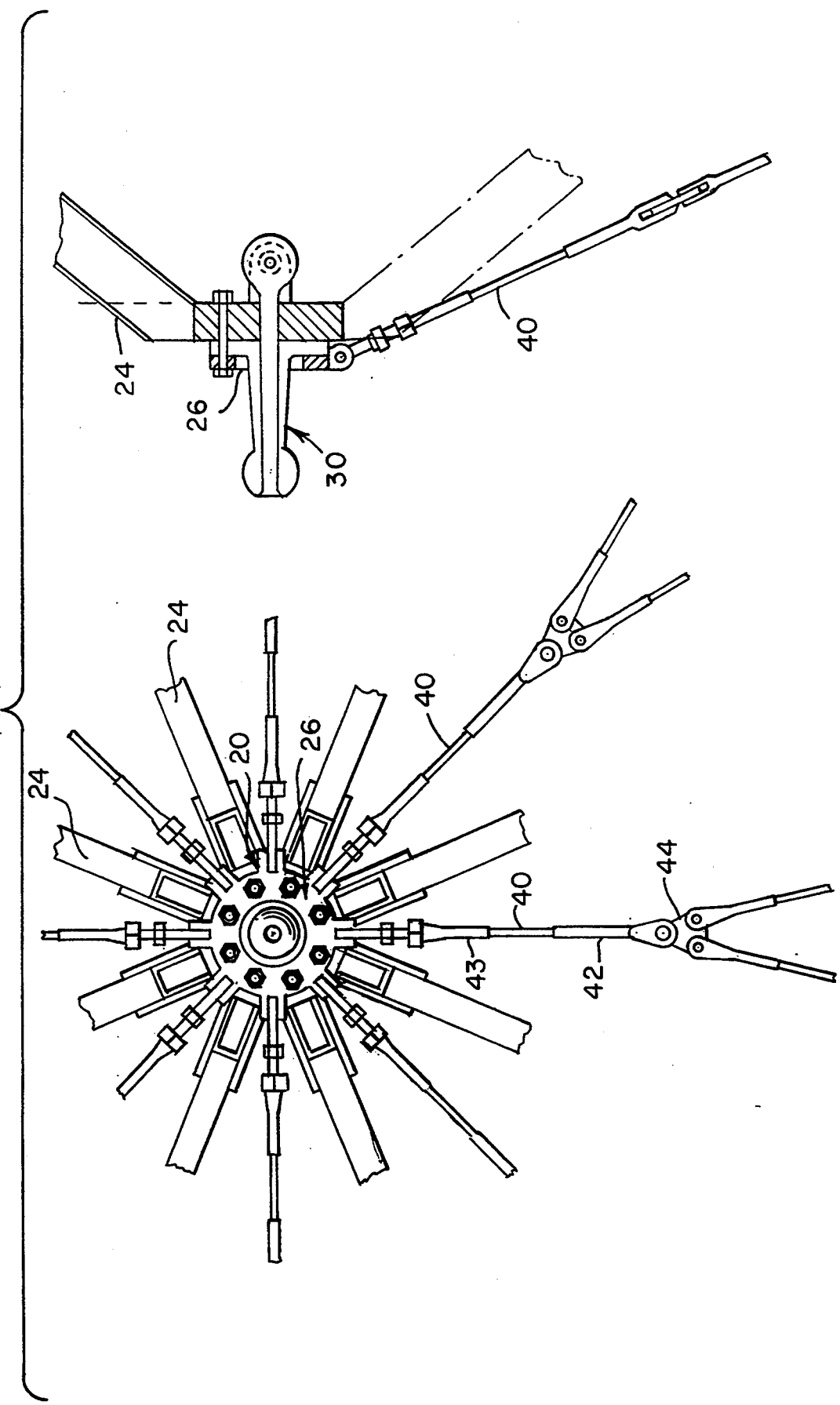
FIG. 4 illustrates a top portion of the truncated cone-shaped truss assembly of FIG. 3.
Figure 5:
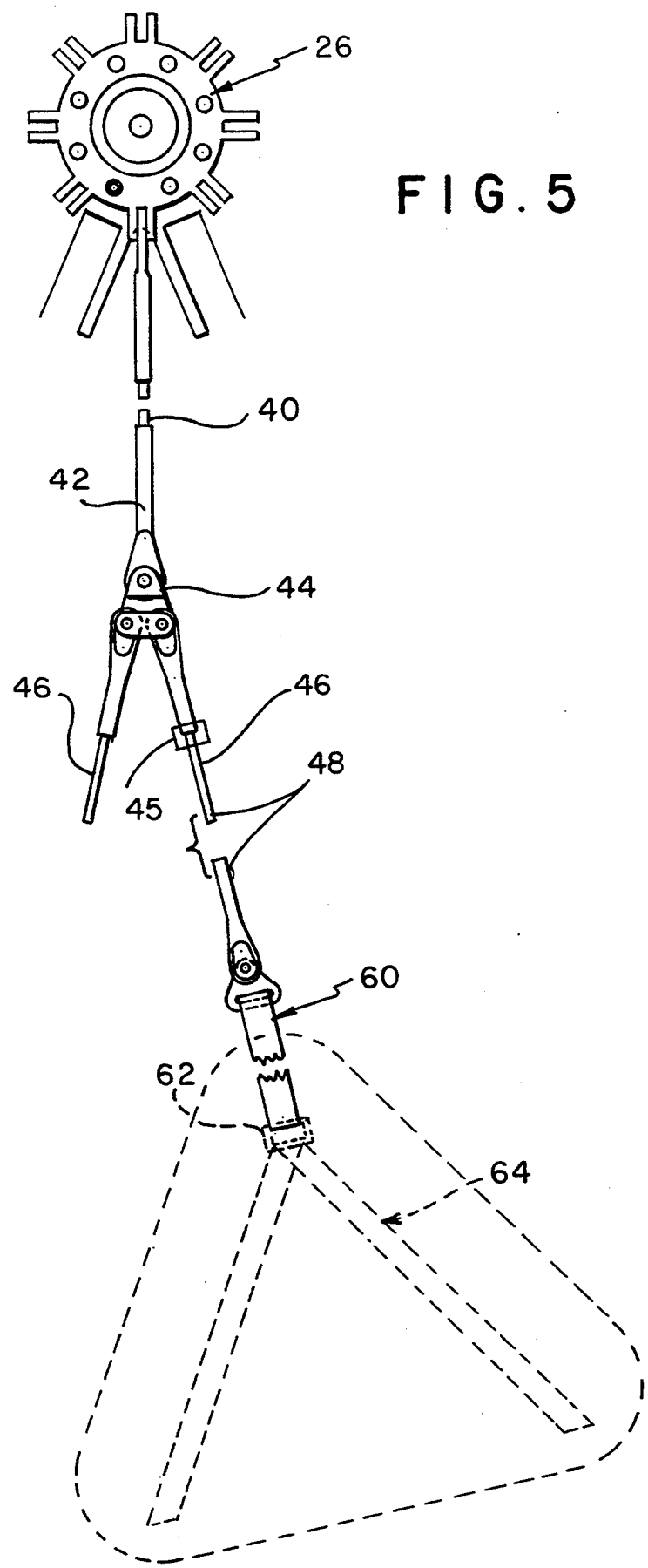
FIG. 5 illustrates the guy cables, top plate, and patches of FIG. 3.

FIG. 4 illustrates the top portion of the truncated cone-shaped truss assembly 20 in more detail. Each of the struts 24 which originate at the base ring 22 extend upward and are joined to the top plate 26. In between each of the struts 24, is connected one of the guy cables 40. Further, the docking probe 30 is attached to a top portion of the top plate 26. Each of the guy cables 40 which, in a preferred embodiment is ⅜" in diameter, is terminated with a fork end terminal 42 and eye end terminal 43. In a preferred embodiment, the guy cables 40 are made of steel or other metallic composition and coated with a plastic weather barrier. However, the guy cables 40 could also be of a nonmetallic material. The guy cables 40 with terminal 42 are attached to a tri-plate 44, wherein the guy cable 40 is divided into two sub-cables 46, as illustrated in FIG. 5, which, in a preferred embodiment, are ⅜" in diameter and coated with plastic. The two sub-cables 46 are also terminated with fork end terminals 48. A heat shrinkable tubing 45 is attached to the junction of cables 40 or 48 with terminals 42 or 44 as an additional weather barrier. Each of the sub-cables 46 is attached to a webbing loop 60. The loop 60 is connected to buckle 62, which is attached to webbing 64 which protrudes from the aerostat hull 50 and is sewn to patch 70 of the aerostat hull 50. The patch 70 is attached to the aerostat hull by heat sealing. In a preferred embodiment of the present application, the patch is a deltoid-shaped load patch 70 and is made of a dacron/-TEDLAR ™/MYLAR ™ laminate.

The improved lightweight nose cone assembly described above operates as follows:

The base ring 22 of the nose cone assembly is laced to the aerostat hull 50. Further, each of the plurality of guy cables 40 is attached at one end to the top plate 26 and at the other end to one of a plurality of patches sealed into the aerostat hull 50. In order to moor the lighter than air vehicle by attaching it to a mooring mast, the steel docking probe 30 is guided into a corresponding receptacle on the mooring tower. As discussed above, the basic operating concept of the improved lightweight nose cone assembly 10 for lighter than air vehicles of the present application is the pulling axial forces are react primarily by the guy cables 40, pushing forces are supported by the nose cone and reacted by the aerostat hull 50 pressure forces, and transverse loading is reacted by guy cable tensions and sure forces in the nose cone base ring 22.

The improved lightweight nose assembly for lighter than air vehicles of the present application includes a cone assembly and guy lines for attaching the lighter than air vehicle to the mooring mast. This assembly, as illustrated in FIGS. 3–5, results in substantial savings in weight and cost and is more efficient than the existing hard nose structures with battens. Further, the improved lightweight nose cone assembly for lighter than air vehicles of the present application greatly simplifies vehicle installation and inflation.

With the invention being thus described, it will be obvious that the same may be varied in many ways. Such variations are not to be regarded as a departure from the spirit and scope of the invention and all such modifications as would be obvious to one skilled in the art are intended to be included within the scope of the following claims.

I claim:

1. A lightweight hard nose assembly for mooring a lighter than air vehicle, comprising:
    a cone assembly, including
       a base ring, attached to said lighter than air vehicle,
       a top plate, including a docking probe, and
       a plurality of struts, connecting said base ring to said top plate; and
    a plurality of guy lines, originating from said cone assembly and attached to said lighter than air vehicle at a plurality of patches.

2. The lightweight hard nose assembly of claim 1, wherein said base ring is laced to said lighter than air vehicle.

3. The lightweight hard nose assembly of claim 1, wherein said plurality of guy lines are made of a metallic material.

4. The lightweight hard nose assembly of claim 3, wherein said plurality of guy lines are made of steel.

5. The lightweight hard nose assembly of claim 1, wherein said plurality of guy lines are made of a nonmetallic material.

6. The lightweight hard nose assembly of claim 1, wherein said plurality of guy lines are coated with a plastic coating.

7. The lightweight hard nose assembly of claim 1, wherein said plurality of patches are deltoid patches made of a fabric laminate.

8. The lightweight hard nose assembly of claim 1, wherein said lighter than air vehicle is an aerostat or airship.

9. The lightweight hard nose assembly of claim 1, wherein said plurality of guy lines originate from said top plate.

10. A lightweight hard nose assembly for mooring a lighter than air vehicle, comprising:

nose means for attaching said lighter than air vehicle to a mooring tower and for reacting pushing forces and transverse loading from said lighter than air vehicle; and cable means for attaching said nose means to said lighter than air vehicle and for reacting pulling axial forces and said transverse loading from said lighter than air vehicle.

11. The lightweight hard nose assembly of claim 10, said nose means including, a base ring, attached to said lighter than air vehicle, a top plate, including a docking probe, and a plurality of struts connecting said base ring to said top plate; and said cable means including a plurality of guy lines originating from said nose means and attached to said lighter than air vehicle at a plurality of patches.

12. The lightweight hard nose assembly of claim 11, wherein said base ring is laced to said lighter than air vehicle.

13. The lightweight hard nose assembly of claim 11, wherein said plurality of guy lines are made of a metallic material.

14. The lightweight hard nose assembly of claim 13, wherein said plurality of guy lines are made of steel.

15. The lightweight hard nose assembly of claim 11, wherein said plurality of guy lines are made of a nonmetallic material.

16. The lightweight hard nose assembly of claim 11, wherein said plurality of guy lines are coated with a plastic coating.

17. The lightweight hard nose assembly of claim 11, wherein said plurality of patches are deltoid patches made of a fabric laminate.

18. The lightweight hard nose assembly of claim 11, wherein said lighter than air vehicle is an aerostat or airship.

19. The lightweight hard nose assembly of claim 11, wherein said plurality of guy lines originate from said top plate.

* * * * *